Patented Oct. 9, 1945

2,386,696

UNITED STATES PATENT OFFICE 2,386,696

ADHESIVE COMPOSITIONS

Joseph Lloyd, Pendleton, Salford 6, England, assignor to J. Mandleberg & Company Limited, Pendleton, England, a British company No Drawing. Application May 25, 1942, Serial No. 444,425. In Great Britain October 29, 1941

4 Claims. (Cl. 260—755)

This invention has for its object to provide an adhesive composition useful for many services, some of which are herein indicated, in which the adhesive property is retained over long periods, the material being capable of being readily stripped from a surface to which it has been applied either directly by brushing, pasting or otherwise or upon a suitable fabric, paper or like carrier.

The improved adhesive composition comprises natural rubber or synthetic rubber, together with resinous gutta percha or balata or resinous rubber (which bodies have adhesive properties), stabilising agents such as magnesium usta, and rubber anti-oxidants such as Flectol H (Monsanto product, acetone-aniline condensation product) or other well known preservative, together with where necessary colouring matter, lake colours or pigments. Carbon black, lithopone or titanium oxide may be added to give opacity and proof against light infiltration or penetration. Zinc oxide, and aluminium or other metallic powder may be added for specific services.

The ingredients are mixed together on mills or internal mixers as used in the rubber industry and the dry composition is converted into a paint or spreading mixture by the addition of a suitable solvent such as petroleum or coal tar solvents or a non-inflammable solvent such as carbon tetrachloride.

The correct consistency of the mass may be obtained for any purpose by modification of the milling procedure and the proportion of solvent.

The mass or composition may be made more homogeneous and free flowing by the addition of waxes or oils such as paraffin wax.

A transparent adhesive covering is sometimes required as an adhesive backing to translucent paper as for example for tracing and masking in photography for colour reproduction and tinting. Such an adhesive covering is prepared by using pale crepe rubber, resinous gutta percha, balata or rubber, which will not stain or colour the mixture, magnesium usta and a colourless anti-oxidant, together with the appropriate amount of solvent.

A self vulcanising adhesive mixture may be produced by using two mixtures, one containing one or more vulcanisation accelerators, and the other containing sulphur or other substance to promote vulcanisation. The two mixtures are brought together just prior to use as an adhesive after which the rubber will vulcanise in a few hours at atmospheric temperature; the adhesive property persists however for a considerable period.

My improved adhesive may be used by itself and rubbed off dry or removed by a suitable solvent. Or it may be applied to a suitable backing or carrier for use as a readily removable mask in photography, motor vehicle spray painting and in printing. It may be used to secure posters or the like on hoardings, windows, showcases &c., the posters being readily stripped from their supports when required to be removed. It may also be used in bookbinding, in the manufacture of leather and fancy goods, for securing wall paper, blackout materials &c. Further it can be applied to materials which have been previously coated with rubber proofings or other products, such as synthetic rubber or synthetic resins and cellulose. This prepared material can be used as permanently adhesive taping strips or sheets for various purposes.

Example I

A typical composition by weight of a light resisting adhesive is:

| | | |
|---|---|---|
| Smoked sheet rubber | pounds | 10 |
| Gutta resin | do | 2 |
| Magnesium oxide | do | 1 |
| Zinc oxide | do | 4 |
| Carbon black | do | 2 |
| Flectol H (Monsanto product, acetone-aniline condensation product) | oz | 1 | and solvent.

If the solvent be carbon tetrachloride, from 48 to 80 lbs. by weight are used; if petroleum or coal tar solvent, from 24 to 40 lbs. are used.

Example II

A typical transparent adhesive is compounded as follows:

| | | |
|---|---|---|
| Pale crepe rubber | pounds | 10 |
| Gutta resin | do | 2 |
| Magnesium usta | do | 1 |
| Flectol H (Monsanto product, acetone-aniline condensation product) | oz | 1 |

The solvent is as in the previous example.

Example III

If to one portion of a composition as in Example I there be added 2½ oz. of Vulcafor Z. D. C. (I. C. I. product, zinc diethyl dithiocarbamate) and 2½ oz. of Vulcafor Z. I. X. (I. C. I. product, zinc isopropyl xanthate) and if to another similar portion of the same composition there be added 9½ oz. of sulphur, preferably the precipitated variety, then if these two portions are mixed together just prior to use, the rubber content will be vulcanised in a few hours at atmospheric temperatures and the resulting adhesive will retain its adhesive property for a considerable period.

*Example IV*

Similarly if to one portion of a composition as in Example II there be added 2½ oz. Vulcafor Z. D. C. (I. C. I. product, zinc diethyl dithiocarbamate) and 2½ oz. of Vulcafor Z. I. X. (I. C. I. product, zinc isopropyl xanthate) and if to another similar portion of the same composition there be added 9½ oz. of sulphur, preferably the precipitated variety, then if these two portions are mixed together just prior to use, the rubber content will be vulcanised in a few hours at atmospheric temperatures and the resulting transparent adhesive will retain its adhesive property for a considerable period.

What I claim is:

1. A non-hardening, permanently tacky, adhesive composition, containing rubber and a substance selected from the group consisting of gutta resin and balata resin, in the proportion of about 5 to 1 by weight.

2. A transparent adhesive composition comprising 10 parts (by weight) pale crepe rubber, 2 parts gutta resin, 1 part magnesium oxide, about $\frac{1}{16}$ part of a rubber anti-oxidant, and 24–80 parts of an organic solvent, and adapted to remain tacky after evaporation of the solvent.

3. An opaque adhesive composition, comprising 10 parts (by weight) smoked sheet rubber, 2 parts gutta resin, 1 part magnesium oxide, 4 parts zinc oxide, 2 parts carbon black, about $\frac{1}{16}$ part of a rubber anti-oxidant, and 24–80 parts of an organic solvent, and adapted to remain tacky after evaporation of the solvent.

4. A method of obtaining an adhesive composition adapted to remain tacky after vulcanisation, comprising mixing together just prior to use a portion of a composition as claimed in claim 1 and containing sulphur, and another portion of the same composition, containing a vulcanisation accelerator.

JOSEPH LLOYD.